(12) United States Patent
Kinney et al.

(10) Patent No.: US 7,339,739 B1
(45) Date of Patent: Mar. 4, 2008

(54) ACTIVE DAYLIGHTING AND ACTIVE SOLAR HEATING SYSTEM AND METHOD

(76) Inventors: Laurence F. Kinney, 1335 Deer Trail Rd., Boulder, CO (US) 80302; John Hutson, 13107 Travis View Loop, Austin, TX (US) 78732

( * ) Notice: Subject to any disclaimer, the term of this patent is extended or adjusted under 35 U.S.C. 154(b) by 0 days.

(21) Appl. No.: 11/693,959

(22) Filed: Mar. 30, 2007

(51) Int. Cl.
*G02B 17/00* (2006.01)
*G02B 27/00* (2006.01)

(52) U.S. Cl. .................. 359/591; 359/595; 359/597

(58) Field of Classification Search ............... 359/591, 359/592, 597, 593–595; 362/1; 126/623
See application file for complete search history.

(56) References Cited

U.S. PATENT DOCUMENTS

| | | | |
|---|---|---|---|
| 4,539,625 A * | 9/1985 | Bornstein et al. ............ 362/576 |
| 4,669,817 A * | 6/1987 | Mori ........................... 359/591 |
| 4,720,170 A | 1/1988 | Learn | |
| 4,740,048 A * | 4/1988 | Mori ........................... 359/592 |
| 4,874,225 A * | 10/1989 | Pruszenski, Jr. ............. 359/592 |
| 6,128,135 A * | 10/2000 | Stiles et al. .................. 359/597 |
| 6,201,643 B1 | 3/2001 | Carlson | |
| 6,341,041 B1 | 1/2002 | Carlson | |
| 6,381,070 B1 * | 4/2002 | Cheng ......................... 359/591 |
| 6,840,645 B2 * | 1/2005 | Eisenman et al. ............. 362/2 |

* cited by examiner

*Primary Examiner*—Christopher Mahoney
(74) *Attorney, Agent, or Firm*—Yorgos D Marinakis

(57) ABSTRACT

A daylighting system for structures consisting of a solar energy collector means including a modified Cassegrainian optical system, a means of moving said collector means to an attitude tracking the sun's position in the sky during daylight hours, a heat separation means for removing heat from the concentrated beam of sunlight and for applying said heat to other uses, and one or more hollow members each comprising a reflective internal surface for distributing the sunlight inside said structure.

19 Claims, 16 Drawing Sheets

ACTIVE DAYLIGHTING AND ACTIVE SOLAR HEATING SYSTEM AND METHOD

CROSS-REFERENCE TO RELATED APPLICATIONS

Not applicable.

STATEMENTS REGARDING FEDERALLY SPONSORED RESEARCH AND DEVELOPMENT

Not applicable.

BACKGROUND

The present invention satisfies the need of a daylighting system for structures of all types: a daylighting system that can be implemented without retying on solar radiation incident on the sides of those structures which requirement may be difficult to satisfy in crowded urban environments, and without requiring large openings in the conditioned envelopes of the structures which openings can result in thermal loss; a daylighting system that has the capability of providing solar heating when desired white also having the capability of limiting solar heat gain when desired; a daylighting system that avoids fire danger, minimizes interior glare, allows for independent and individualized control of light and heat in locations throughout the building; a daylighting system that minimizes the load on the air conditioning system during the cooling season; and a daylighting system that can be built in a range of sizes as appropriate to the thermal parameters of various climatic zones or to the heat and light needs of various sizes of structures. The embodiments of the present invention may be installed as new or retrofit systems in structures of all types, including but not limited to conventional and unconventional residential and commercial structures, trailers or mobile homes, modular houses and recreational vehicles.

Information relevant to attempts to address these problems can be found in U.S. Pat. Nos. 4,720,170; 6,201,643; and 6,341,041; which are not admitted to be prior art with respect to the present invention by its mention in this Background Section. It is desirable to have better apparatuses and/or methods than what is disclosed in each of the identified references.

U.S. Pat. No. 4,720,170 ('170) uses a tow-mounted primary collector, which is susceptible to being shadowed by other structures, whereas the embodiments of the present invention utilize either a high-mounted primary collector, or a separable, remotely deployable collector. In '170, a primary mirror is specified that may be flat, concave, or convex; whereas the embodiments of the present invention are limited to operating with concentrated light from a modified Cassegrainian optical system having two parabolic mirrors. In '170, a point-to-point system for routing light through light pipes (reflectorized glass pipes, various plastics, or brightened metallic tubes) and fiber optics is disclosed; whereas the embodiments of the present invention provide a much larger pool of light from which users can extract at will, thereby providing a means for varying the amount of light brought into the occupied space. In addition, '170 does not use diffusers, whereas some embodiments of the present invention use them.

Both U.S. Pat. Nos. 6,201,643 ('643) and 6,341,041 ('041) disclose and claim a daylighting system that resides entirely inside the building. In '643 and '041, the light collector is located on the side of the building, which is susceptible of shading in situations in which buildings or structures are close together, as in urban settings or in suburban cluster zoning; whereas the embodiments of the present invention utilize a roof-top collector or a separable collector, thereby providing a means for avoiding the aforementioned shading problems. In '643 and '041, a point-to-point system for routing light through hollow members is disclosed; whereas the embodiments of the present invention provide a much larger pool of light from which users can extract at will, thereby providing a means for varying the amount of light into the occupied space. In '643 and '041, the user has no control over the intensity or degree of light in the interior space; whereas the embodiments of the present invention provide the user with at least two mechanisms for controlling such intensity or degree, namely redirection or "pick-off" mirrors and movable shutter or shutters over the translucent materials in the wall which transmit the light into the interior. In '643 and '041, the size of the hollow members and their materials of construction is not specified, though the drawings indicate something like HVAC tubes; whereas the embodiments of the present invention utilize hollow members including but not limited to HVAC tubes, vacant shafts in the structure, and rectilinear boxes made of various materials such as metal, steel and/or wood.

The pertinent fields of the art follow:

International Classification: G02B 17/00.

U.S. Classification: 359/591

DEFINITIONS

The subpoint of the sun is the latitude and longitude that an imagined string tied between the center of the earth and center of the sun passes through the surface of the earth at any given moment, or the location on earth at which the sun has an elevation of ninety degrees (directly overhead).

Active daylighting systems have moving parts that track the sun. They use such techniques as automatically moveable solar energy collectors, light pipes, and windows that control the amount of available daylight in buildings.

Active solar heating systems and active solar energy systems trap solar energy and then use intelligent and/or automatically controlled dynamic means to utilize that energy, as heat or as energy, respectively.

Light pipes are glass pipes, various plastics, or metallic tubes, all of which have highly-reflective internal surfaces.

The primary hollow member is alternatively referred to as the "light wall."

Translucent panels are glazed or clear, and are made of polycarbonate, glass, Plexiglas®s and their equivalents.

SUMMARY

The embodiments of the present invention are active daylighting systems that also serve as active solar heating systems. Daylighting systems are optical-mechanical systems that use natural sunlight to illuminate the interiors of structures. But because the concentration and subsequent redirection of sunlight into the interior of a structure also has the effect of heating that building, it is often desirable to partition the incident solar energy into infrared energy and visible light, and then to strip off the infrared energy and put it to uses for which it is suited prior to said redirection, such as for heating specific items or for energy production. The visible light is then redirected to illuminate the structure. The embodiments of the present invention perform both of these tasks.

Whereas previous daylighting systems merely provide point-to-point systems for routing light, the embodiments of the present invention create and maintain a controlled flow (stream) of light within a light wall from which users can actively extract at will through a means for varying the amount of light into the occupied space. The means for user control include the remote control of redirection mirrors or "pick-off" mirrors, the manual control of covers over translucent panels, and a mirror that can be partially or completely placed over the heat separation means in order to partially or completely direct the incoming solar energy away from the interior of the building.

After the solar collector means concentrates the beam of light, the beam may be passed through a heat separation means. There, the heat is stripped off and directed towards an insulated box i.e., the infrared radiation is redirected to the box, white the visible spectrum is transmitted. When there is more daylight than is desired, some portion of the visible spectrum may also be redirected to the box. The insulated box contains either a black, fluid-filled pipe, or thermal photovaoltaic cells, or visible light photovoltaic cells, or any combination thereof. The fluid in this pipe gathers solar energy, becoming hot. A pump moves water into an insulated storage system at a rate that optimized storage efficiency. This constitutes an active solar system. Heat thus obtained may be put to a number of uses, including domestic hot water, space heating and (via absorption cooling system) space cooling The magnitude of heat gathered by the active solar system depends on the solar energy available, and the amount of infrared and visible portions of the spectrum that are directed to the active solar system versus the passive solar heating system and daylighting system/method.

Moreover, the system is scalable, in the sense that the system may be built in different sizes to accommodate the different heating and lighting requirements that various climatic regimes impose on structures, or, as appropriate to the heat and light needs of various sizes of structures. More energy, for example, is required to comfortably heat a structure in a cold climate as compared to a structure of equal size in a warmer climate. The solar energy collector means utilized in some of the embodiments of the present invention, namely a parabolic trough, has the advantage over a circular parabolic reflector of having a constant cross-section and is thus able to be scaled up or down in size by adding or removing sections or being cut to length. Further, on account of very highly reflective first surface mirrors that cover the inner surface of the parabolic trough, which mirrors are in the form of sheet stock that can be readily bent, a great deal of that flux can be directed in ways that are useful. In addition, the penetration of the system into the structure is proportionate to the size of the structure. A single-story small building has minimal penetration of the light wall into the structure: a few inches into the space from the ceiling, the light wall is terminated. Solar flux is then directed via an inverted Vee-shaped reflector or other means as described herein, to spread solar flux across the ceiling and the tops of adjacent walls, providing daylight illumination as well as all or a portion of the solar energy collected by the system as desired.

DRAWINGS

These and other features, aspects and advantages of the embodiments of the apparatus and/or methods will become better understood with reference to the following description, appended claims and accompanying drawings where:

Figure 1:
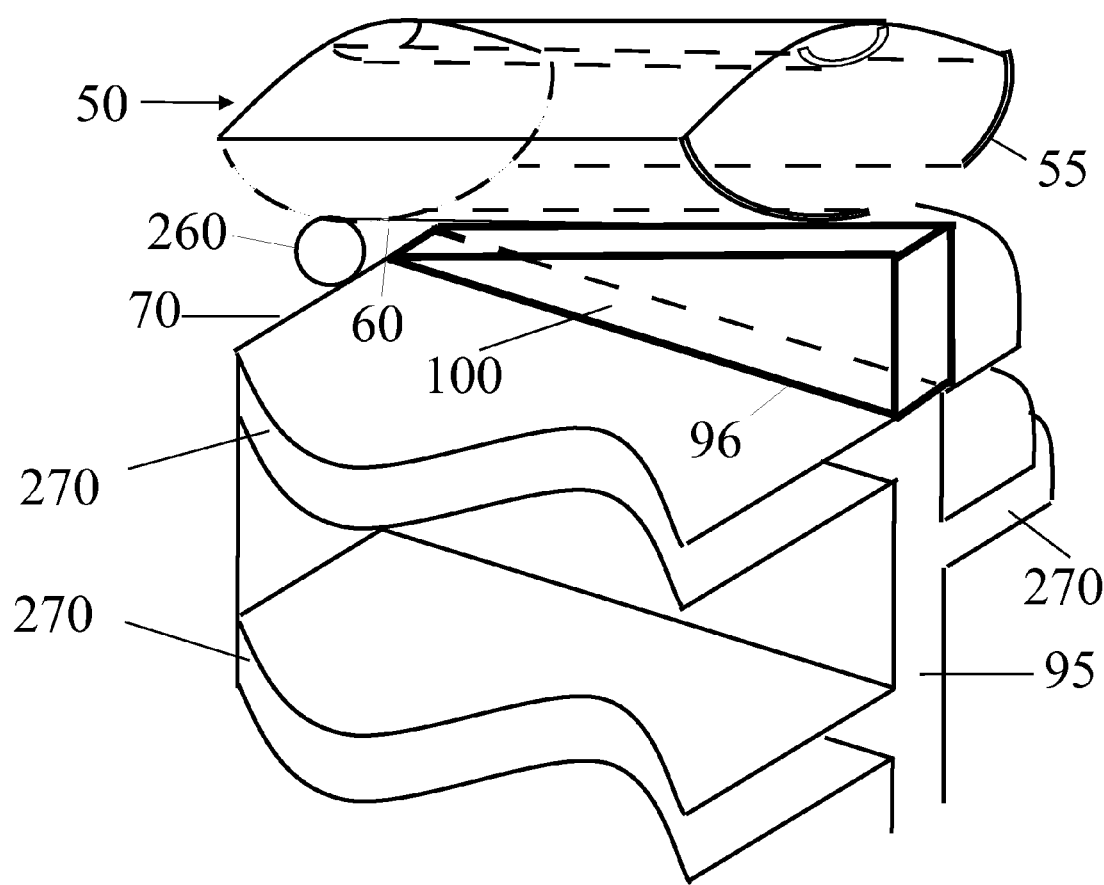
FIG. 1 shows a front and side view of the parabolic trough and portions of the primary and secondary hollow members, in vertical and horizontal configurations, respectively.
Figures 2A, 2B, 2C, 2D:
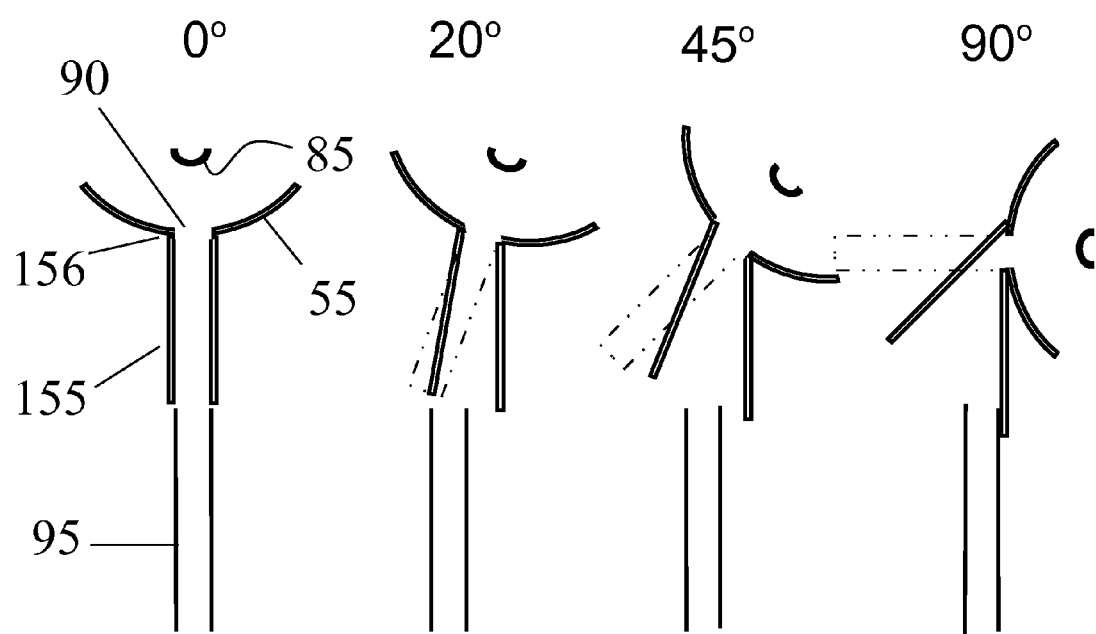
FIGS. 2a through 2d show a side view of the parabolic trough at various angles for collecting sunlight and the top of the primary hollow member in a vertical configuration.

REFERENCE NUMERALS FOR DRAWINGS light wall cover 4;
solar energy collector 50;
parabolic trough 55,
parabolic dish 56;
spine 60 of parabolic trough 55;
roof 70;
glass, Plexiglas®, polycarbonate, or similar cover 75;
Curved glass, Plexiglas®, polycarbonate, or similar cover 76;
primary mirror (M1) 80;
secondary mirror (M2) 85;
approximately rectangular slot 90 at the bottom of the parabolic trough 55;
primary hollow member 95;
angled extension 96 of primary hollow member 95;
open end 100 of the primary hollow member 95;
heat separation glass 105;
insulated box 110;
black pipe 115;
collector plate 116;
dosed end 125 of the primary hollow member 95;

closed-end reflector 130;
electric lighting fixtures 135;
cover mirror 140;
insulating shutter 145;
bottom 150 of the parabolic trough 55;
tertiary mirror (M3) 155;
hinge 156;
structure 170;
pick-off mirror 175;
piano lid-style hinge or similar hinge 180;
upper pick-off mirror 185;
top edge 190 of upper pick-off mirror 185;
lower pick-off mirror 195;
top edge 200 of tower pick-off mirror 195;
lower edge 201 of lower pick-off mirror 195;
lever arm 210;
motor 260;
translucent panel 265;
shutter 266;
track for shutter 267;
secondary hollow member 270; and
fiber optics, tight pipes or similar technology 275.

DESCRIPTION

The embodiments of the present invention consist of: a solar energy collector means including a modified Cassegrainian optical system, a means of moving said collector means to track the sun's position in the sky during daylight hours, a heat separation means for removing heat from the concentrated beam of sunlight and for applying said heat to other uses, and at least one hollow member having a reflective internal surface and a mirror at one end. The embodiments of the invention are partially disposed within a structure such as a conventional or unconventional residential and commercial structure, trailer or mobile home, modular house or recreational vehicle. The embodiments of the invention utilize a modified Cassegrainian system: whereas Cassegrainian systems have a parabolic primary mirror and a hyperbolic secondary mirror, with the goat of creating an image via the optics, the current system has both parabolic primary and secondary mirrors, with the goat of creating a parallel beam. The solar energy collector means is disposed either on top of the hollow member, or separately from it, in which case the concentrated beam of light is transmitted from the solar energy collector means to the hollow member through light pipes, fiber optics or their equivalents. At least one section of one hollow member is disposed contiguous to an interior ceiling or wall of the structure, and that ceiling or wall opens up to and is in communication with that section of the hollow member, allowing reflected light to transmit from the hollow member to the interior of the structure. A solar energy collector means provides light to primary hollow member, although one or more solar energy collector means may provide light to one or more primary hollow members. A given structure could host one or more copies of a single embodiment. A given structure could host one or more different embodiments.

In the preferred embodiment, the solar energy collector means is in the form of a parabolic trough that sits on a roof facing the sun, on top of the primary hollow member or "light wall," which primary hollow member in the preferred embodiment is generally vertical. In other words, the top of the vertical primary hollow member opens up to and is in communication with the bottom of the solar energy collector means. We refer to this end as the open end, and the other end as the closed end. This embodiment also includes one or more generally secondary hollow members, which intersect and are in communication with the vertical hollow member; that is, the horizontal hollow members branch off the vertical hollow member.

In a second embodiment, the solar energy collector means is in the form of a parabolic trough with a modified Cassegrainian optical system, the primary hollow member or "light wall" is vertical, and there are no secondary hollow members.

In a third embodiment, the solar energy collector means is in the form of a parabolic trough with a modified Cassegrainian optical system, which solar energy collector means is disposed separately from the primary hollow member. The parabolic trough may still be disposed on the roof, but it may also be disposed off the structure entirety. In any case, the concentrated beam of light from the trough is transmitted to the primary hollow member through light pipes, fiber optics or their equivalents. The primary hollow member or "light wall" is horizontal, and the secondary or branching hollow members are vertical.

In a fourth embodiment, the solar energy collector means is in the form of a parabolic trough with a modified Cassegrainian optical system, which solar energy collector means is disposed separately from the primary hollow member. The concentrated beam of light from the trough is transmitted to the primary hollow member through light pipes, fiber optics or their equivalents. The primary hollow member or "light wall" is horizontal, and there are no secondary hollow members.

As the aspect ratio of the cross section of the primary hollow member approaches 1:1 in each of these four embodiments, the solar energy collection means can be implemented in the form of a parabolic dish rather than a parabolic trough, thereby constituting four more embodiments, respectively (embodiments five through eight). Such a dish is described in U.S. Pat. No. 6,128,135 by Stiles and Kinney.

There are also an infinite number of embodiments where the primary hollow member is canted at an angle between zero degrees and ninety degrees, inclusive, relative to a tangent to the surface of the earth, without (embodiment nine) or with a secondary hollow member or members branching from them at any angle (embodiments ten through twelve). As long as the primary hollow member is roughly vertical and its top opens up to the roof, the solar collector means may sit on top of the primary hollow member. Once the primary hollow member is canted significantly away from the vertical, then the concentrated beam of light from the solar energy collector means may need to be transmitted to the primary hollow member through light pipes, fiber optics or their equivalents. This additional set of variations constitutes another embodiment or set of embodiments (embodiment nine). Similarly, the primary member may be vertical and the secondary members may be canted at an angle between zero degrees and ninety degrees, inclusive, with respect to the surface of the earth, forming another embodiment or set of embodiments (embodiment eleven). Additionally, both the primary and secondary hollow members may be canted at an angle between zero degrees and ninety degrees, inclusive, with respect to the surface of the earth, forming another embodiment or set of embodiments (embodiment ten). The preceding embodiments may utilize a parabolic trough, parabolic dish or a similar solar radiation-concentrating heliostat as the solar collector means.

The solar energy collector means, such as a parabolic trough, a parabolic dish or similar solar radiation-concentrating heliostat, when disposed on the roof, is high-mounted to avoid being shadowed by other structures, and is parabolic to concentrate the solar rays. The solar energy collector means, however, may also be separate from the structure, where the light is transmitted from the solar energy collector means to the top or the sides of the structure through fiber optics, light pipes or similar technology.

Both the primary hollow member and the secondary hollow member or members have internal surfaces that are reflective over their entire surface area. The surface materials that provide for the internal reflectivity of both the primary and secondary hollow members include but are not limited to silver, highly polished aluminum, and anodized aluminum such as Alanod® (www.alanod.de). The hollow members are rectilinear boxes and may also be tubular or other hollow shapes.

Light within the primary hollow member is selectively redirected or "picked-off" by redirection mirrors or "pick-off" mirrors to supply natural lighting to spaces on its first pass coming down. These are a pair of forty-five degree mirrors within the interior of the primary hollow member, which redirect light either into a secondary hollow member or into the interior space of the structure (e.g., a room).

At the closed end of the primary hollow member is a retro-reflector, referred to as the closed-end reflector, which reflects light that was not picked-off back towards the open end of the primary member. The closed-end mirror can be either flat and normal to the axis of the main hollow member or it can be a partially diffuse reflector that minimizes the potential for local areas of high intensity light ("hot spots"). The closed-end reflector improves the performance of the system by preventing the loss of light at the closed end.

In addition, at the closed end of the primary hollow member are back-up lights. These back-up lights are efficient electric light sources that turn on as required (either automatically by light sensors or manually by users to supply illumination to the spaces.

The system also allows the user to control the back-up lights automatically. In the preferred embodiment, the control comprises a computer-based system through which there is a continuous interaction between (a) the instantaneous lighting needs of people in the building, (b) what is currently being delivered from the solar system, (c) what can be delivered from the solar system given present availability of flux from the sun, (d) what is being delivered by the back-up lighting system, and (e) what can be delivered by the back-up lighting system.

The primary hollow member, in combination with its interior redirectional mirrors, provides a stream of light from which users may selectively tap, either through a single opening or through multiple openings in the sides of the primary hollow member. These openings may be translucent windows in the side of the hollow member, optimally in combination with pick-off mirrors that redirect light through these openings or translucent windows. Each opening is covered with a translucent panel or panels, made of Plexiglas®, glass or similar materials, whether glazed or unglazed. Each panel is covered with a movable shutter or shutters, whose surfaces that face into the hollow member are fabricated from or covered with a reflective material. The movable shutter or shutters are manipulated manually or driven by a motor and controlled by a switch similar to a standard light switch or dimmer. When more light is desired, the user more fully opens the shutters. When less light is desired, the user more fully closes the shutters. The shutter may be installed inside the hollow member (therefore outside the interior space) or inside the interior space (therefore outside the hollow member).

The longitudinal axis of the parabolic trough is aligned on an approximately north-south axis and rotated it so that the focal line of the trough always points to the sun. If the installation is north of the Tropic of Cancer (23° 26' 22" north latitude), the sun will always be to the south at solar noon; if south of the Tropic of Capricorn (23° 26' 22" south latitude), the sun will always be north at solar noon. Between the tropics, it can be south or north at solar noon, depending on season. At latitudes associated with the US, the sun rises north of east six months of the year and south of east the others. When the sun is directly to the east or west of the parabolic trough, all of the flux that the primary mirror intercepts goes directly to the secondary mirror, illuminating it evenly, and thence to the slot at its bottom. When the sun is north or south of the parabolic trough, some portion of the secondary mirror is not illuminated as a direct function of how far north or south the subpoint of the sun is from the locus of the installation. Thus some potential flux is lost and also some flux is inserted down the vertical hollow member at some non-optimal angle. The ideal solution to the problem of enabling the secondary mirror to be uniformly illuminated is to track in elevation as well as azimuth. If a parabolic trough is used as the solar energy collector means, the consequences of a lack of flux on one or the other end of the secondary mirror can also be lessened by covering the ends of the trough transverse to the longitudinal axis with reflective material such as silver, Alanod®, or similar highly-reflective material. Although one end of the secondary mirror will still not be illuminated by direct beam, this will ensure that the other end has substantially more flux hitting it. This will cause the rays reflected from the end of the trough to be at an angle that is complementary to the angle of the rays that are not similarly reflected. To avoid shadowing of a portion of the trough, only one end should have reflective material installed at a time, the end farthest from the sun. During periods when the sun is south of the parabolic trough, the north end of the trough should be covered with reflective material; when the sun is north of the parabolic trough, the south end of the trough should be covered with reflective material. During half of the year, no changes in which end is covered are needed, but during the other half of the year, changes have to be made twice a day. Accordingly, a mechanism that uses roller shade-style technology may be employed to efficiently and economically cover (or uncover) a given end of the parabolic trough. For example, a highly reflective material may be adjoined to the surface of a shade-Like material whose shape is that of the end of the trough. One embodiment employs a thin, magnetic material highly reflective on one side that may be rolled up or down from a shade mechanism located at the top end of the trough. Actuated by a motor and controlled automatically, when the reflective shade is in place it adheres to the ferrous metal that forms the shape of the parabola to keep it in place when deployed. When rolled up, it is stowed at the top of the frame where it takes up little space and causes virtually no shadowing.

In embodiments with secondary hollow members, at least one of the secondary members opens up to and is in communication with an interior wall or ceiling of the building. As above, that opening is covered with a translucent panel or panels, made of Plexiglas®, glass or similar materials, whether glazed or unglazed. Those panels are covered with a movable shutter or shutters, whose surfaces that face into the hollow member are fabricated from or covered with a reflective material. The movable shutter or shutters are operated manually via a crank or similar mechanism or driven by a motor and controlled by a switch similar to a standard light switch or dimmer. When more light is desired, the user more fully opens the shutters and/or increases the back-up lighting, depending on the amount of natural light available. When less light is desired, the user via the control switch activates the control switch which then more fully closes the shutters and/or reduces the back-up lighting. The shutter may be installed inside the hollow member (therefore outside the interior space) or inside the interior space (therefore outside the hollow member).

In embodiments with translucent panels for diffusers, the panels are of a number of shapes and sizes. Large rectilinear panels stretch the width of a conference room or the wall of a restaurant. A round panel above a favorite easy chair, or a pair of panels on either side of a desk with a computer screen, creates a good reading environment without glare. A panel of the shape and colors of a corporate logo is employed in an executive suite or in the lobby of a hotel. Special animation and lighting effects coordinated with music accompany daylit bas reliefs in sates areas. Fitting rooms or bathrooms are equipped with panels that surround mirrors, providing excellent color rendering and glare-free illumination.

Areas of translucent panels are removed and replaced with clear glass or Plexiglas® to provide direct beam spot or area lighting on plants or sculptures.

If more light is desired than can be provided by a fully open shutter or shutters, the user may actuate at least one pair of pick-off mirrors, located inside the primary hollow member and controllable with the same means or with an additional switch, the lower edge of one mirror adjacent to the top edge of the other mirror. In their dormant position, each pick-off mirror is parallel and adjacent to one interior side of the vertical hollow member, with its reflective surface exposed to the interior of the hollow member. When actuated, the upper mirror rotates approximately forty-five degrees around its top edge into the space of the hollow member, and the lower mirror rotates approximately forty-five degrees around its bottom edge into the space of the hollow member, the two mirrors form an isosceles triangle. This triangle directs light transversely to the longitudinal axis of the hollow member to the other interior side of the hollow member, which interior side contains a translucent panel separating the interior of the hollow member from the interior space of the building. The planar dimensions of each pick-off mirror are small enough to not interfere with the transmission of light through the hollow member, yet large enough to provide a substantial amount of additional light into the interior room.

As discussed above, one feature of the invention is the heat separation means, such as an approximately forty-five degree glass that is highly reflective in the near infrared portion of the spectrum but highly transmissive in the visible portion of the electromagnetic spectrum, having a solar heat gain coefficient sufficiently low to remove most of the heat and a visual transmittance sufficiently high to transmit most of the visible light. Such a heat separation means allows for the natural light delivered to the spaces to have a luminous efficacy that is in excess of 200 Lumens per watt (candies have a luminous efficacy of approximately 1 μm/w, incandescents 15, compact fluorescents 65, metal halide 80, direct beam sun 113). Spaces receiving natural light thus are not heated to any significant extent by the natural light and the potential air conditioning load is lowered significantly. That is, the watts of heat introduced to the conditioned envelope is quite small in relation to the lumens of illumination delivered. Further, sunlight has color rendering properties that are the best possible. The waste heat is redirected to provide hot water and/or electricity via thermal photovoltaic cells so it is controlled and put to good use.

At the point at which the primary hollow member passes through attic (or roof) insulation, there is optionally an insulating shutter (nominally two inches thick with an R-value of approximately 15), situated above all pairs of pick-off mirrors, with reflective surfaces top and bottom. The shutter is hinged or slides back and forth across the top of the primary hollow member, seating the wall from the movement of air and providing a significant thermal barrier from the inside to the outside of the conditioned envelope of the building when closed.

The heat separation means and the insulating shutter enable the user to finely control his thermal surroundings. Overnight, the cover mirror is deployed over the heat separation means and the insulating shutter is closed. In early morning when solar flux starts to be received, the insulating shutter is opened and the cover mirror over the heat separation means is moved out of the way of incoming flux, allowing maximal light through the primary hollow member white redirecting the infrared to produce hot water or electricity via photovoltaics. Once the user decides that the space is bright enough, he may adjust the cover mirror to intercept most or all of the visible and infrared portion of the incoming flux from the collector, directing it to produce hot water or electricity via photovoltaics. The insulating shutter may be manipulated as well to open at night when outside air temperatures fall below indoor air temperatures, a circumstance typical of climate areas with modest cloud cover. The embodiments of the invention can be adjusted to optimize space heating and cooling conditions and natural illumination white allowing for the production of as much hot water and photovoltaic electricity as practical.

When less light is needed than is available from the sun, the extra flux is directed to hot water heating and electricity generation. Back up lighting is added to the degree needed when the instantaneous sun light gathered is inadequate for lighting needs.

Optionally, a special pick-off mirror and associated optics, all located within a hollow member, direct light perpendicular to the end of a fiber optic bundle, which in turn is used to direct high intensity natural light for task and display lighting, such as a chandelier. Other special effects with fiber optics and light wheels are employed with exotic effect. This offers designers unique opportunities to illuminate special areas remote from immediate sources of daylight. The fact that the embodiments of the invention and associated light ducts provide substantial flux well within buildings provides for short-run fiber optic applications with natural lighting where such could not exist before.

The following table depicts several embodiments. A few of them are discussed in the text following the table. Embodiment #1 is the preferred embodiment or best mode of practicing the invention.

TABLE 1

Selected embodiments.

| Embodiment | solar energy collector means | Location of solar energy collector means | Primary Hollow Member (number, orientation) | Secondary Hollow Member (number, orientation) |
|---|---|---|---|---|
| 1 | One or More Parabolic Troughs | Top of Primary Hollow Member | One or more, Vertical | One or More, Horizontal |
| 2 | One or More Parabolic Troughs | Top of Primary Hollow Member | One or more, Vertical | None |
| 3 | One or More Parabolic Troughs | Separately from Primary Hollow Member | One or more, Horizontal | One or More, Vertical |
| 4 | One or More Parabolic Troughs | Separately from Primary Hollow Member | One or more, Horizontal | None |
| 5 | One or More Parabolic Dishes | Top of Primary Hollow Member | One or more, Vertical | One or More, Horizontal |
| 6 | One or More Parabolic Dishes | Top of Primary Hollow Member | One or more, Vertical | None |
| 7 | One or More Parabolic Dishes | Separately from Primary Hollow Member | One or more, Horizontal | One or More, Vertical |
| 8 | One or more Parabolic Dishes | Separately from Primary Hollow Member | One or more, Horizontal | None |
| 9 | One or More Parabolic Troughs, Parabolic Dishes or similar Solar Radiation-Concentrating Heliostats | Separately from Primary Hollow Member | One or more, canted at an angle with respect to the surface of the earth between 0 degrees and 90 degrees inclusive | None |
| 10 | One or More Parabolic Troughs, Parabolic Dishes or similar Solar Radiation-concentrating Heliostats | Separately from Primary Hollow Member | One or more, canted at an angle with respect to the surface of the earth between 0 degrees and 90 degrees inclusive | One or more, canted at an angle with respect to the surface of the earth between 0 degrees and 90 degrees inclusive |

EMBODIMENT #1

Preferred Embodiment or Best Mode

As shown in FIG. 1, in this embodiment there are one or more vertical primary hollow members 95 and one or more horizontal secondary hollow members 270 branching from it. The solar energy collector means 50 is a parabolic trough 55 with a modified Cassegrainian optical system that is disposed on top of the primary hollow member 95 at its open end 100. The parabolic trough is oriented approximately on a north-south axis, with the parabola opening up towards the sky and its spine 60 sitting on the roof 70. With respect to its longitudinal axis, the solar energy collector means 50 is either parallel to an approximately horizontal roof 70 or mounted to an angled extension of the primary hollow member 96 so that it is tilted at an angle that is approximately equal to the latitude of the system's installation with the lower end pointing to the equator or at any angle in between. Such angle, if calculated and implemented properly, optimizes the performance of the collector. The parabolic trough optionally is controlled with a motor 260 to track apparent solar motion.

In daily operation, as shown in FIGS. 2a through 2d, the parabolic trough 55 is rotated by means of a motor that is attached to the parabolic trough, over the diurnal cycle, on the longitudinal axis of the trough 55, such rotation ensuring that the parabolic trough 55 generally points toward the sun. As shown in FIG. 1, the parabolic trough may also be tilted at an angle with respect to the surface of the earth approximately equal to the latitude of the system's installation, to optimize tracking the sun's position in the sky during daylight hours.

Figure 3:
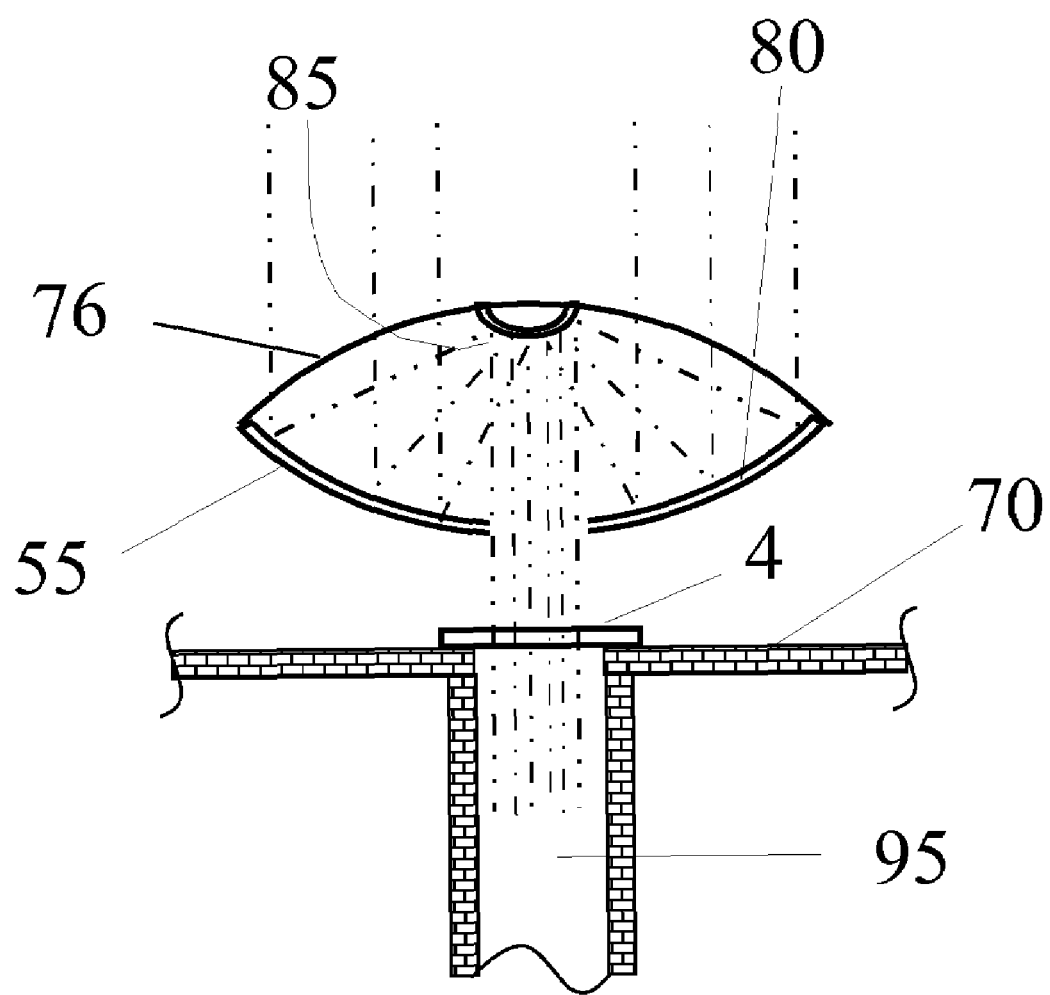
FIG. 3 shows a side view of the parabolic trough.

As shown in FIG. 3, the parabolic trough 55 is covered with a glass, Plexiglas®, polycarbonate, or similar cover 76, whose properties are chosen to optimize the performance of the system as a function of season. In winter, the cover is clear with both high solar heat gain coefficient and visual transmittance. In summer, the cover can be equipped with a reflective surface that is highly reflective in the infrared portion of the electromagnetic spectrum yet highly transmissive in the visual portion of the electromagnetic spectrum, resulting in a relatively low solar heat gain coefficient and high transmissivity.

Figure 4A:
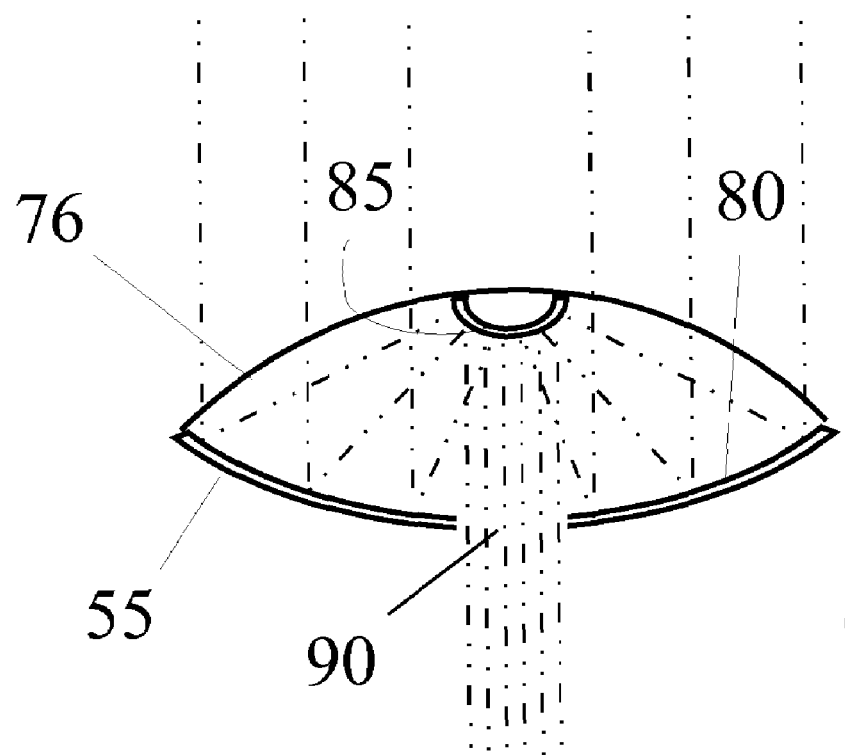
FIGS. 4a and 4b show side views of two alternative designs of the parabolic trough, one with the focus well within the trough and one with the focus well above the trough.
Figure 4B:
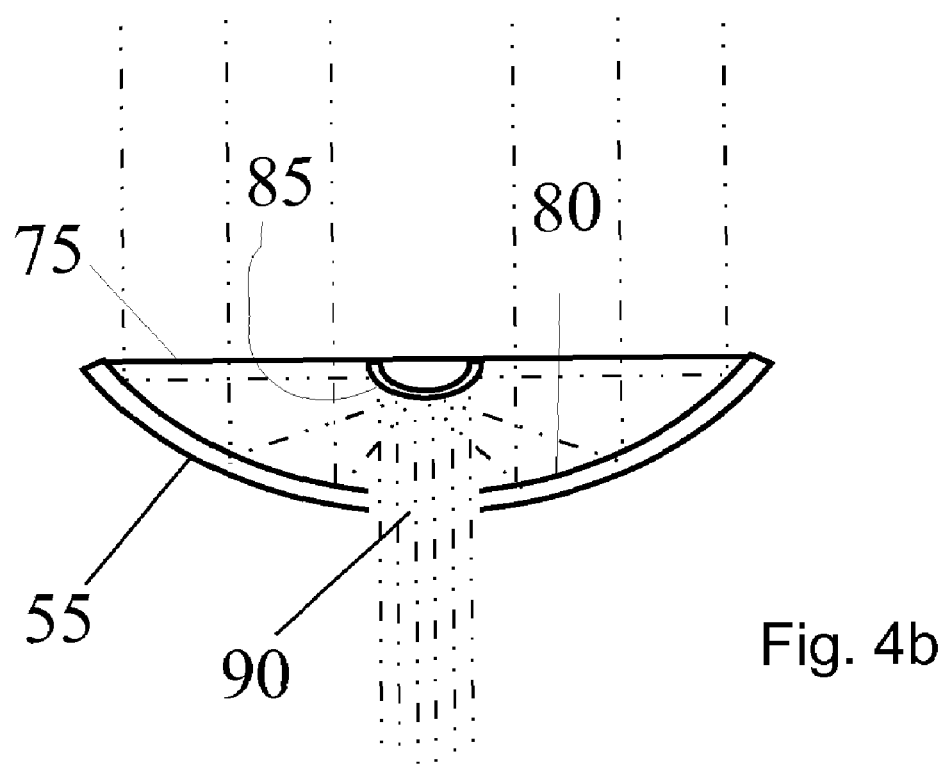

As shown in FIGS. 4a and 4b, the focus of the parabolic trough 55 is located either well within the parabolic trough 55 or well above it. Light rays strike the parabola, which is coated with a first-surface specular mirror (primary mirror, or M1) 80, which mirror is highly reflective in the visible and near infrared portions of the electromagnetic spectrum. The light is reflected towards the focus of the parabola, but shortly before reaching the focus, the reflected rays strike another mirror (secondary mirror, M2) 85. This secondary mirror 85 is parabolic in shape and is also a highly reflective first-surface specular mirror. The parabola of this secondary mirror 85 is designed so that reflections from it are approximately parallel with one another and are directed towards an approximately rectangular slot 90 at the bottom of the parabolic trough 55, said reflections from said secondary mirror 85 resulting in a concentration of the incoming rays of a factor of from 10 to 40 depending on the geometry of the two mirrors and the slot 90. The preferred embodiment in terms of cost effectiveness, simplicity, and optical performance is the one with the flat glass cover 75 in two sections where the two pieces glass span from the inner edge of the main parabolic mirror 80 to the outer edges of the assembly that holds the secondary mirror 85. This means that the focal point would occur immediately above the plane of the covering glass 75, but the sunlight is prevented from coming to a focus because it is intercepted (and redirected) by the secondary mirror 85. The curved glass approach 76, however, would achieve better mechanical stability.

Figure 5:
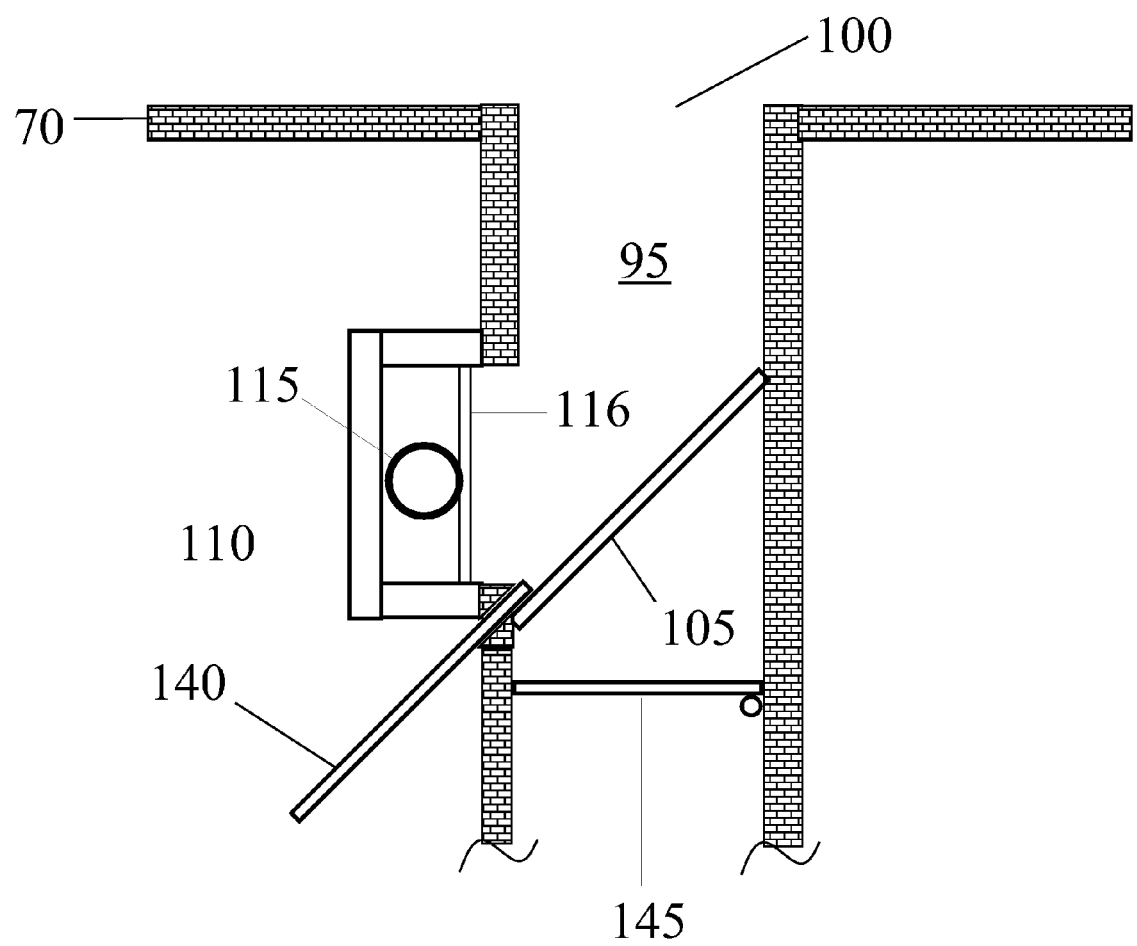
FIG. 5 shows a side view of the infrared collecting aspects of the embodiments of the invention.

As shown previously in FIG. 1, in this preferred embodiment the vertical primary hollow member 95 is an approximately rectilinear box. As shown in FIG. 5, at the top end 100 of this vertical primary hollow member 95 there is a heat separation means comprising a heat separation glass 105 fixed at approximately forty-five degrees with respect to the incoming beam of light. This heat separation glass 105 is highly reflective in the near infrared portion of the spectrum but highly transmissive in the visible portion of the electromagnetic spectrum, having a solar heat gain coefficient sufficient to remove most of the heat and a visual transmittance sufficient to transmit most of the visible light. The heat separation glass 105 can be covered by a cover mirror 140 which can be manipulated via a small motor or manually to intercept any portion of the flux from the solar energy collector means. When the availability of solar light exceeds the needs of the building, this movable cover mirror 140 diminishes light through the light wall but uses the extra to heat hot water or produce electricity. The position of the movable cover mirror 140 may also be determined automatically. The portion of the visible beam that is reflected, as well as the infrared, is directed to an insulated box 110 that contains a black pipe 115 having emissivity approaching unity, which black pipe 115 has a fluid such as water running though it at a rate that will add heat to water in an insulated storage tank, which stored hot water may then be used for heating, space heating or cooking. Collector plate 116 provides a thermal coupling between the relatively wide light flux and small diameter black pipe 115. When the sun is bright, a two inch pipe may well be exposed to 200 Btu/hour per foot length of pipe from infrared radiation atone. If stagnant, the water in the pipe could be raised well over 100 degrees per hour, enough to perhaps power a small absorption cooler. In all events, the temperature of the water can be varied by changing its flow rate to the heat exchanger in an insulated tank. Alternatively, the reflected infrared energy may be directed to thermoelectric and/or photovoltaic cells, to produce electricity.

As shown in FIG. 5, an insulating shutter 145 can be deployed below the heat separation glass 105, where the side of the shutter facing the interior of the vertical primary hollow member 95 is reflective, so that "wasted" back-up lighting for the back-up lights as reflected from the bottom of the vertical primary hollow member would be returned down from the top end 100 of the vertical primary hollow member 95 to be put to use. If after that the light is not all needed, the back-up lights could be dimmed either stepwise or via continuous dimmers. Further, the insulated shutter 145 would lower convective and conductive losses to the point where they are trivial. This is in contrast with a major problem associated with conventional skylights, where night time losses can be substantially greater than daytime gains. Typically the insulating shutter 145 with highly reflective side down should be inserted horizontally at the level of the insulating in a building, and retractable or moving away via a hinge when not desired. The insulating shutter 145 is an "architectural insulated panel" such as one produced by Metecno-API (www.apipanel.com). It is metal clad, but thermally broken light gauge aluminum with an elegantly-simple way of marrying one piece to another. The manufacturer claims an R-value of 15 for a 2" thick panel.

Figure 6A:
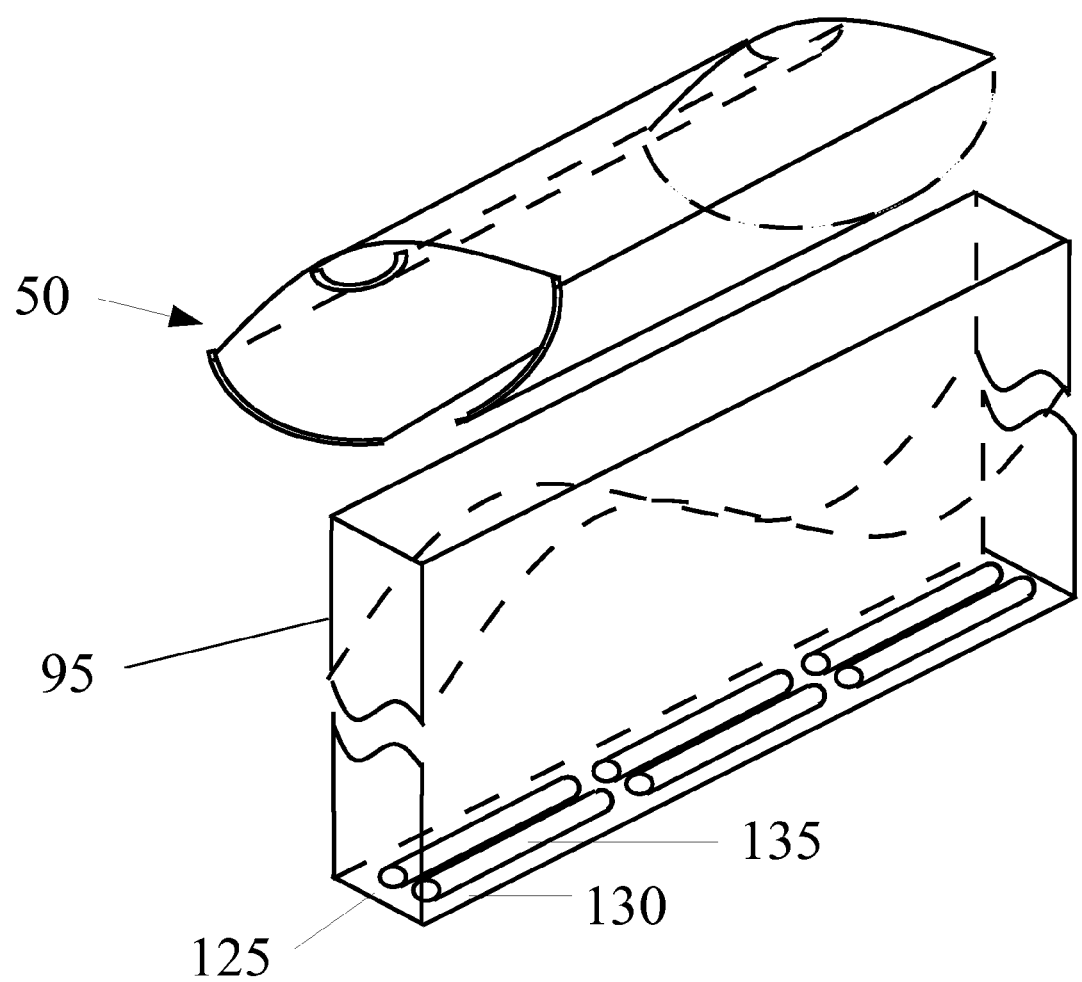
FIGS. 6a and 6b show front and side views of the placement of the back-up lighting at the bottom end of the primary hollow member in the vertical configuration.
Figure 6B:
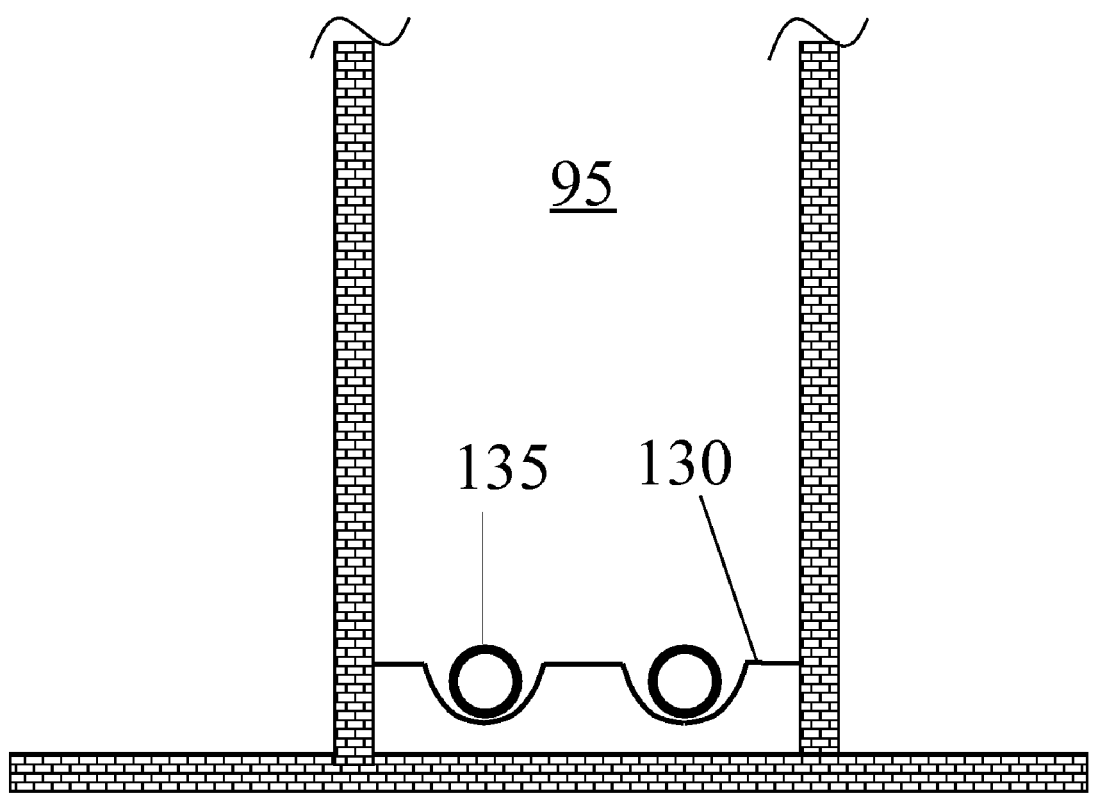

As shown in FIGS. 6*a* and 6*b*, in this embodiment most of the bottom or "closed" end 125 of the vertical primary hollow member 95 consists of a highly reflective first-surface specular reflector or closed-end reflector 130 that directs flux back up the vertical primary hollow member 95. However, this closed-end reflector 130 is interspersed with electric lighting fixtures or back-up lights 135 that may be employed as needed to direct light back up the vertical primary hollow member 95. Ideally these electric lighting fixtures or back-up lights 135 are highly efficient electric lights, that is, high intensity discharge lights such as metal halides, high-output T-5 fluorescents or equivalents, with good color rendering properties, fitted with highly reflective optics designed to produce beams of light that will wash the insides of the vertical primary hollow member 95 at shallow grazing angles. These lights are varied in intensity as an indirect function of the availability of solar illumination and a direct function of user needs.

Figure 7:
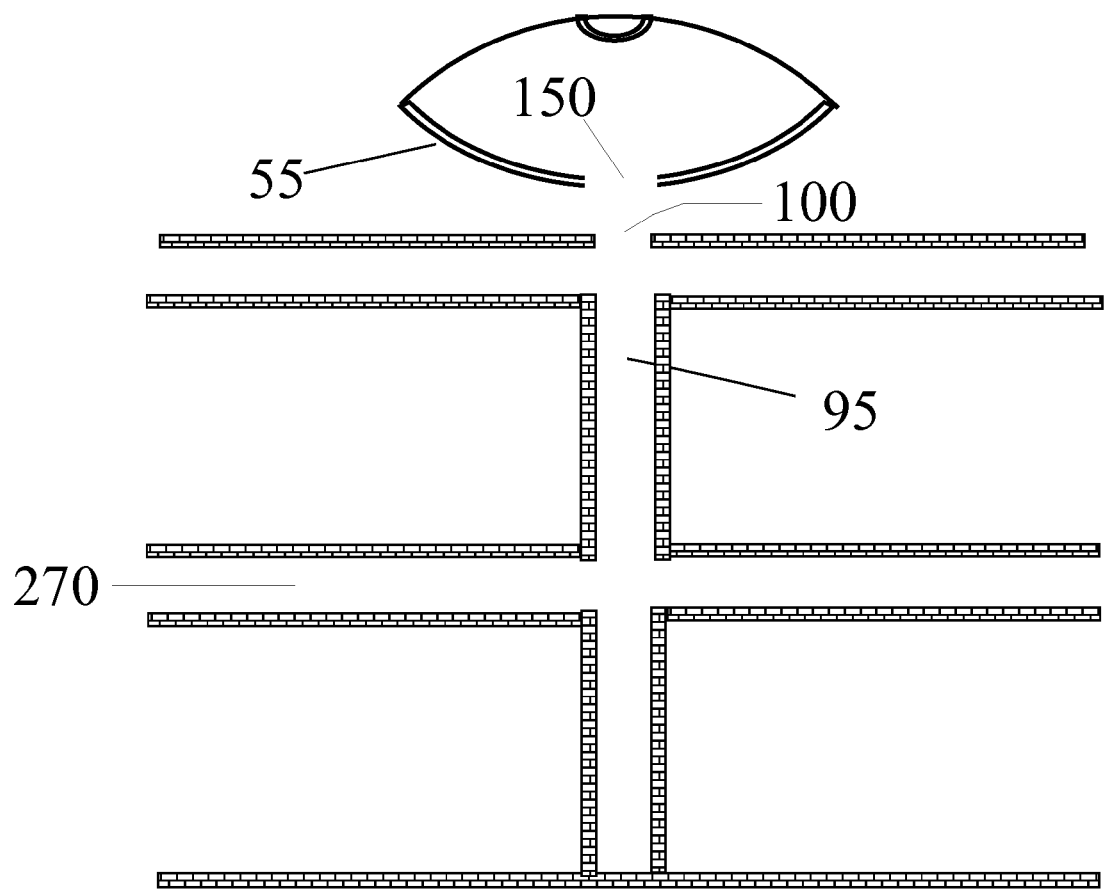
FIG. 7 shows a side view of the parabolic trough and of the vertical and horizontal hollow members.

As shown in FIG. 7, one extent of the vertical hollow member 95 transverse to its longitudinal axis is equal to or slightly greater than the width of the slot 90 at the bottom of the parabolic trough 55; the other extent of the vertical hollow member 95 transversely to its longitudinal axis, but measured ninety degrees from the first extent, extends from below the parabolic trough 55 (and below the associated tertiary mirrors 155, not shown) to the retro-reflector at the closed end of the vertical hollow member, thus connecting to all of the horizontal hollow members and varies with whether it is desired to angle the parabolic trough 55. If the parabolic trough 55 is angled to match the latitude of the installation, then the vertical primary hollow member 95 is higher on the side of the parabolic trough 95 that is highest. The extent of the vertical primary hollow member 95 with respect to its longitudinal axis is as long or slightly longer than the length of the parabolic trough 55 along its longitudinal axis.

As shown previously in FIGS. 2*a* through 2*d*, the open end of the vertical primary hollow member 95 ends below the parabolic trough 55 to accommodate a pair of tertiary mirrors (M3) 155. These tertiary mirrors 155 are highly reflective first-surface specular mirrors, and are approximately rectangular in shape. The extent of a tertiary mirror 155 along its longitudinal axis is slightly longer than the extent of the slot along its longitudinal axis. The extent of a tertiary mirror 155 transverse to its longitudinal axis is approximately five times the extent of the slot transverse to its longitudinal axis. Each tertiary mirror 155 is mounted on a hinge 156 at the edge of the approximately rectangular slot 90 in the parabolic trough 55, the plane of the tertiary mirrors 155 parallel to the length of the parabolic trough 55, the tertiary mirrors 155 having their reflective surfaces facing towards the interior space of the vertical primary hollow member 95 and towards each other. From sunrise to solar noon, one of these tertiary mirrors 155 is active. From solar noon to sunset, the other is active. Both act to direct the beam of light flowing from the bottom of the slot 90 down the vertical primary hollow member 95 in such a way that reflections on the inside of the vertical primary hollow member 95 are minimized.

As shown in FIGS. 2a through 2d, the tertiary mirrors 155 function as 2:1 optical levers so that as the parabolic trough 55 rotates through 90 degrees as it follows the sun from the horizon to directly overhead, the corresponding tertiary mirror 155 rotates 45 degrees to direct the resulting beam down the vertical primary hollow member 95. Accordingly, a simple mechanical lever, gear of similar mechanism is employed to link the movement of the parabolic trough 55 with that of the tertiary mirror or mirrors 155 so that when the parabolic trough 55 rotates N degrees the tertiary mirror or mirrors 155 rotates N/2 degrees. Thus the movements of the entire tracking apparatus require but a single motor.

There is a closed loop control system that adjusts back-up lighting 135, as shown in FIGS. 6a and 6b, to provide whatever is called for by users. These are built into lighting controls that have the same feet as ordinary dimmer controls and are located in similar boxes on the interior walls of the structure.

Figure 8A:
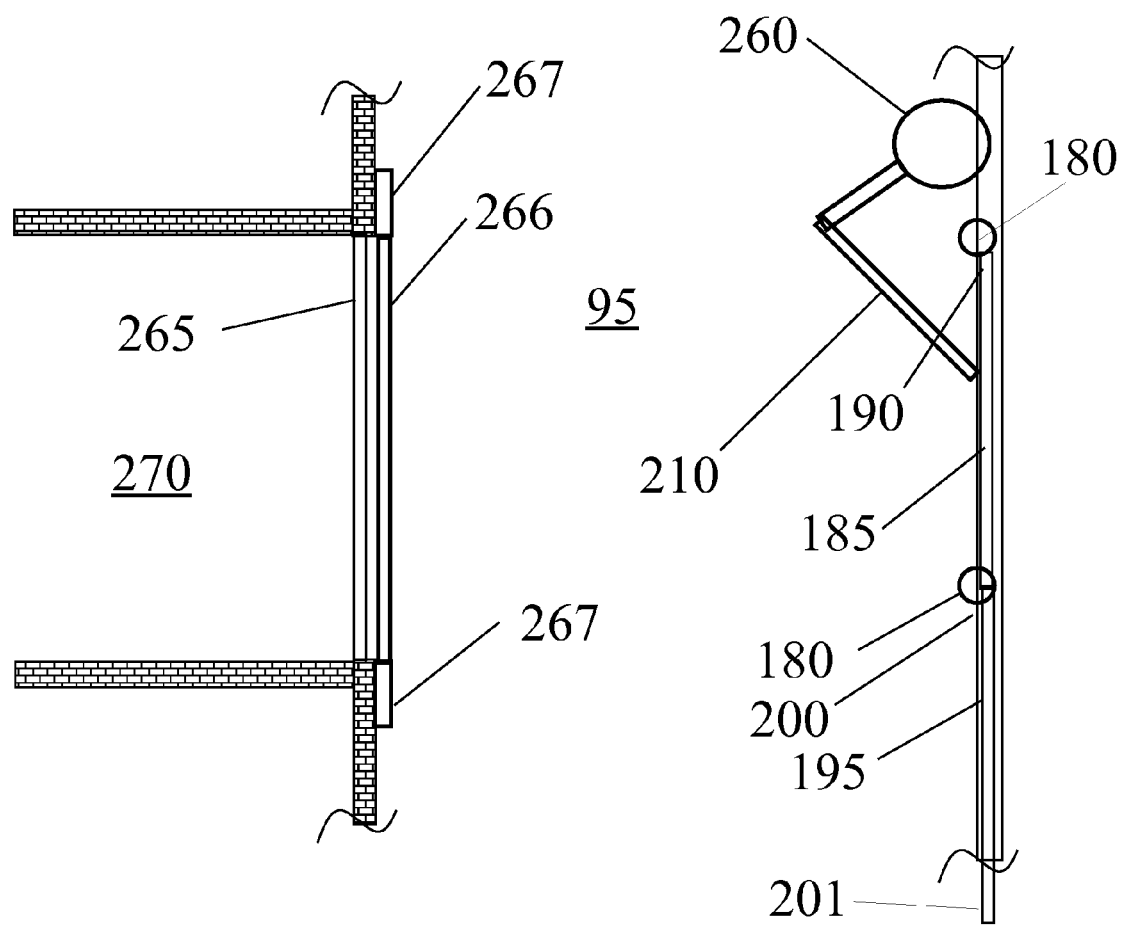
FIG. 8a shows a side view of the redirectional or "pick-off" mirror in the stowed position.
Figure 8B:
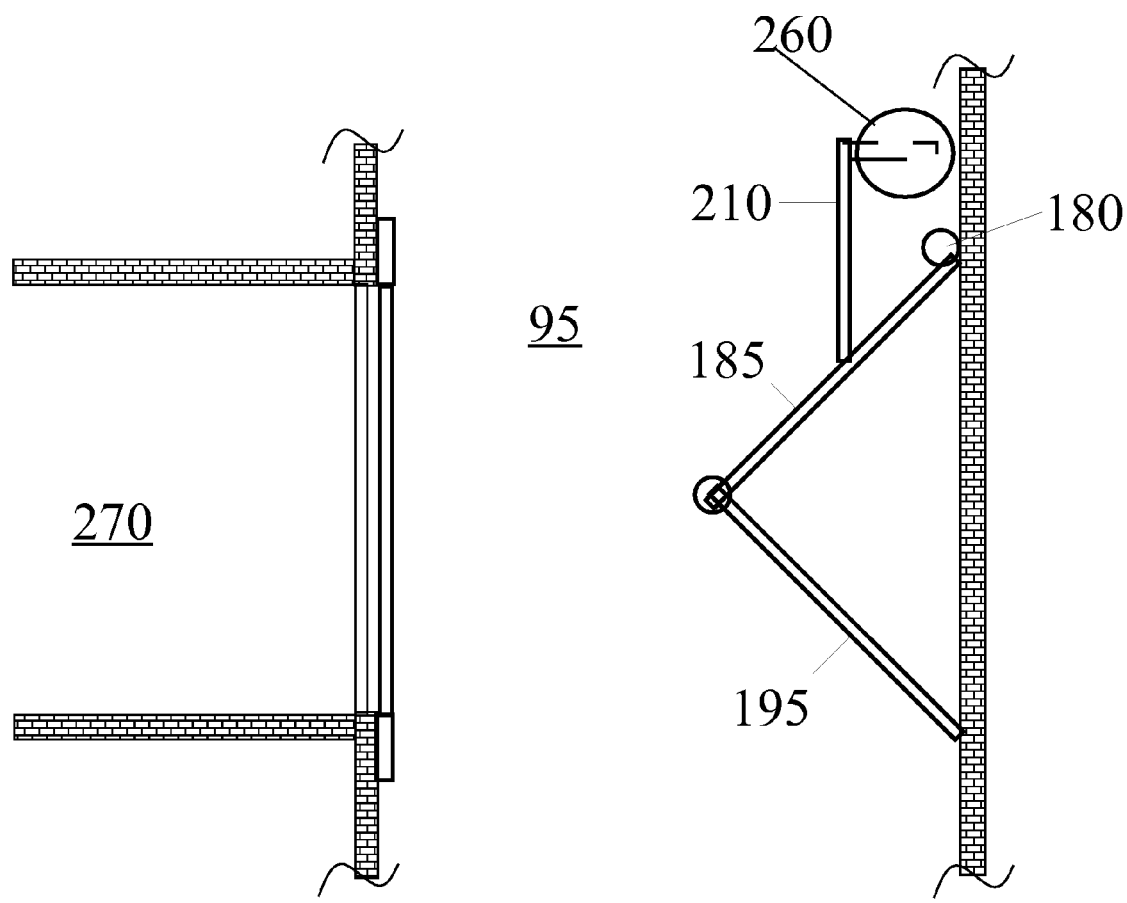
FIG. 8b shows a side view of the redirectional or "pick-off" mirror in the deployed position.

As shown in FIGS. 8a and 8b, in the preferred embodiment each pick-off mirror, 185, 195 is mounted on a piano lid-style hinge or similar hinge 180, where the upper pick-off mirror 185 is hinged at its top edge 190 and the lower pick-off mirror 195 is hinged at its top edge 200 at the intersection between the two mirrors. The lower pick-off mirror 195 travels within a vertical guide that maintains the lower edge of the mirror 195 disposed to the side of the primary hollow member 95 while allowing the upper edge 200 of mirror 195 to rotate towards and away from the primary hollow member 95. When the upper 185 and lower 195 pick-off mirrors are parallel, they are adjacent to the interior of the vertical primary hollow member 95 and do not deflect light into secondary hollow member 270. A lever arm 210 is attached to the upper pick-off mirror and extends approximately forty-five degrees from the plane of the upper pick-off mirror 185 and into the space of the vertical primary hollow member 95. A small motor actuates 260 lever arm 210 thus rotating the upper pick-off mirror 185 about its upper hinge between a vertical position to a 45 degree angle. The lower pick-off mirror is pulled along and is similarly deflected between vertical and a minus 45 degree angle. This arrangement is consistent with a simple installation that could be readily retrofitted from the outside of the vertical primary hollow member 95 after it is installed.

Figure 9A:
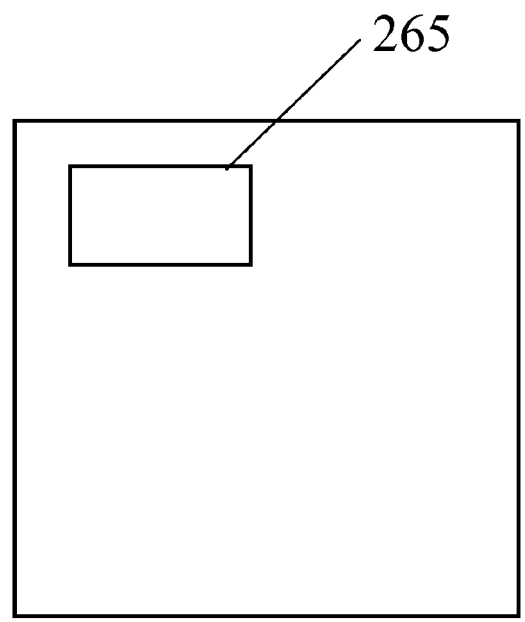
FIGS. 9a and 9b shows a front view of the interior of a room with translucent panels and movable shutters.
Figure 9B:
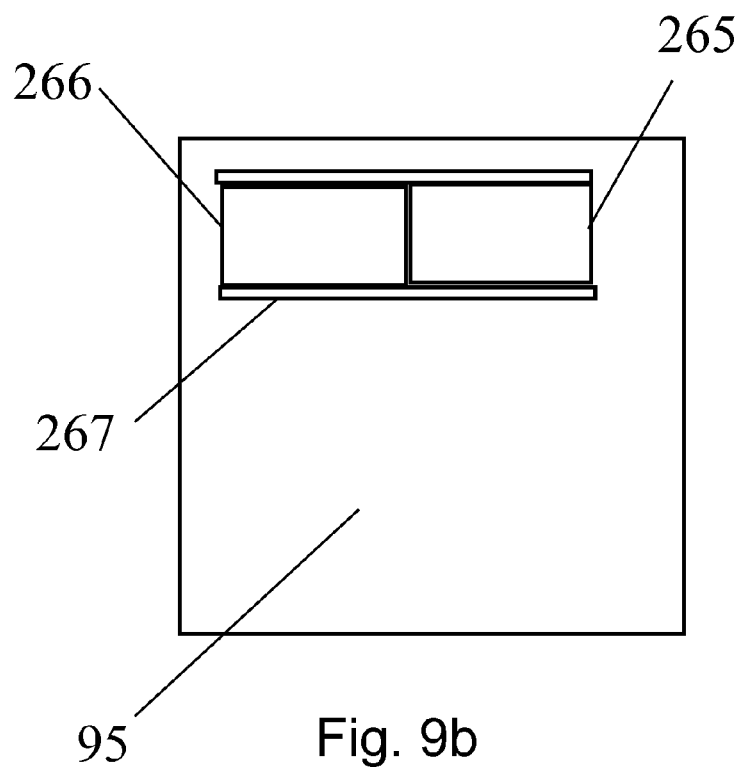

From the vertical primary hollow member 95 branch one or more horizontal secondary hollow members 270 in a tree-Like structure. As shown in FIGS. 9a and 9b, the openings of these horizontal members 270 (not shown) to the vertical member 95 may be covered with translucent panels 265 or with manually- or remotely-controllable shutters 266, or they may be uncovered. These horizontal members 270 may extend above and along ceilings or along walls of the host structure. Optimally there are pick-off mirrors that redirect light from the vertical primary hollow member 95 into the horizontal secondary hollow members.

EMBODIMENT #2

In this embodiment there are one or more vertical primary hollow members 95 and no secondary hollow members 270 branching from it. The solar energy collector means 50 is a parabolic trough 55 that is disposed on top of the vertical primary hollow member 95 at its open end 100.

EMBODIMENT #3

In this embodiment there are one or more horizontal primary hollow members 95 and one or more secondary hollow members 270 branching from it. The solar energy collector means 50 is a parabolic trough 55 that is separate from the primary hollow member 95, and the flux is carried from the solar energy collector means 50 to the primary hollow member 95 via fiber optics, light pipes or similar technology 275.

EMBODIMENT #4

Figure 10:
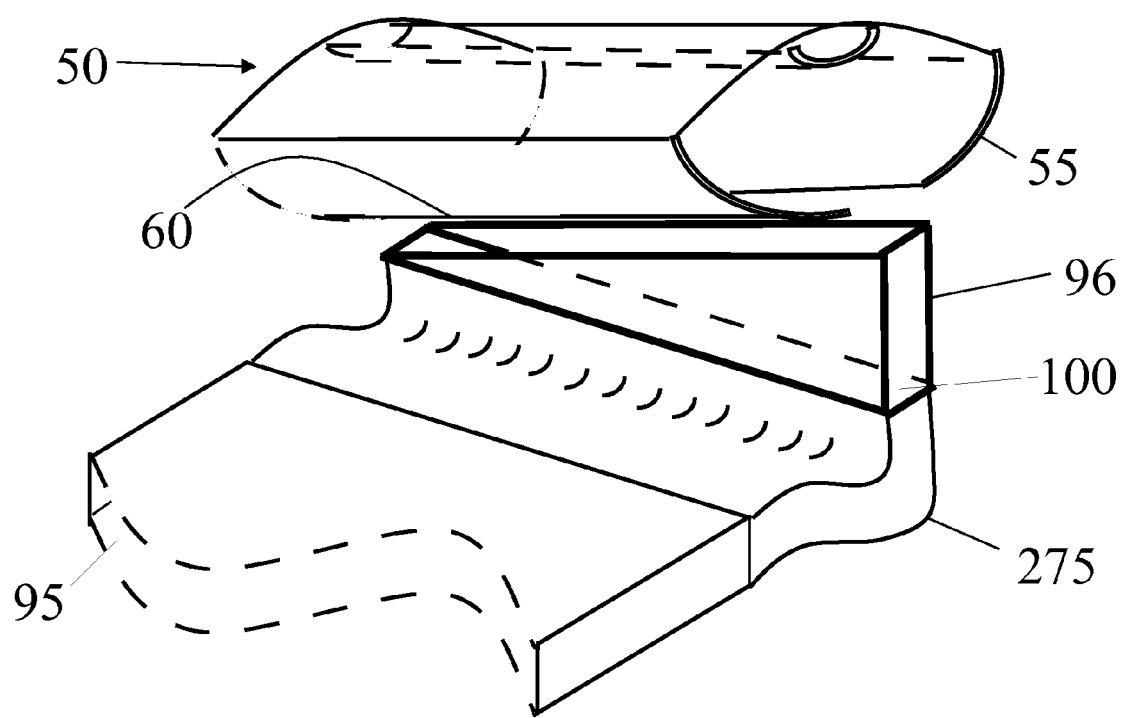
FIG. 10 shows a front and side view of the parabolic trough and portions of the primary hollow member in the horizontal configuration.

As shown in FIG. 10, there are one or more horizontal primary hollow members 95 and no secondary hollow members branching from it. The solar energy collector means 50 is a parabolic trough 55 that is separate from the primary hollow member 95, and the flux is carried from the solar energy collector means to the primary hollow member 95 via fiber optics, light pipes or similar technology 275.

EMBODIMENT #5

Figure 11:
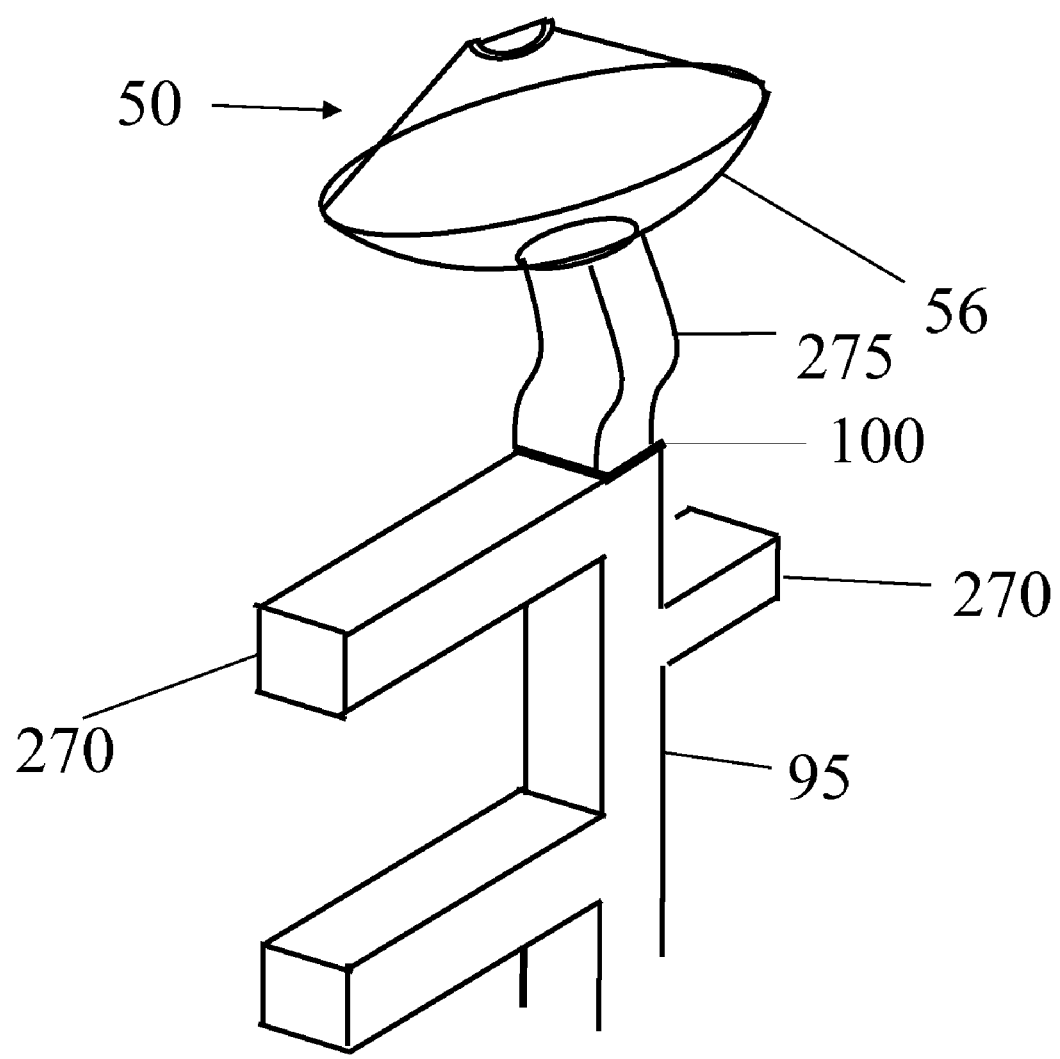
FIG. 11 shows a front and side view of the parabolic dish and portions of the primary and secondary hollow members, in vertical and horizontal configurations, respectively.

As shown in FIG. 11, In this embodiment there are one or more vertical primary hollow members 95 and one or more horizontal secondary hollow members 270 branching from it. The solar energy collector means 50 is a parabolic dish 56 that is disposed on top of the primary hollow member 95 at its open end 100.

EMBODIMENT #6

In this embodiment there are one or more vertical primary hollow members 95 and no secondary hollow members 270 branching from it. The solar energy collector means 50 is a parabolic dish 56 that is disposed on top of the vertical primary hollow member 95 at its open end 100.

EMBODIMENT #7

In this embodiment there are one or more horizontal primary hollow members 95 and one or more secondary hollow members 270 branching from it. The solar energy collector means 50 is a parabolic dish 56 that is separate from the primary hollow member 95, and the flux is carried from the solar energy collector means to the primary hollow member 95 via fiber optics, light pipes or similar technology.

EMBODIMENT #8

In this embodiment there are one or more horizontal primary hollow members 95 and no secondary hollow members 270 branching from it. The solar energy collector means 50 is a parabolic dish 56 that is separate from the primary hollow member 95, and the flux is carried from the solar energy collector means to the primary hollow member 95 via fiber optics, light pipes or similar technology 275.

EMBODIMENT #9

In this embodiment there are one or more primary hollow members 95 canted at angles measured with respect to the earth between zero degrees and ninety degrees inclusive, and no secondary hollow members 270 branching from it. The solar energy collector means 50 is separate from the primary hollow member 95, and the flux is carried from the solar energy collector means 50 to the primary hollow member 95 via fiber optics, light pipes or similar technology 275.

EMBODIMENT #10

In this embodiment there are one or more primary hollow members 95 canted at angles measured with respect to the earth between zero degrees and ninety degrees inclusive, and one or more secondary hollow members 270 branching from it. The solar energy collector means 50 is separate from the primary hollow member 95, and the flux is carried from the solar energy collector means 50 to the primary hollow member 95 via fiber optics, light pipes or similar technology 275.

ADDITIONAL EMBODIMENT

Single-Story Small Structure

This embodiment relates to a single-story small structure 170. In this embodiment, the vertical primary hollow member 95 minimally penetrates into the structure 170: a few inches into the space from the ceiling, the vertical primary hollow member 95 is terminated. Solar flux is then directed via an inverted Vee-shaped reflector or other means as described herein, to spread solar flux across the interior ceiling 165 and the tops of adjacent walls 160, providing daylight illumination as well as all the solar gain collected by the system.

ADDITIONAL EMBODIMENT

Foyer

The primary hollow member 95 in a vertical configuration extends down from the ceiling 165 and opens up into a room 171, either functioning as a wall 160 or as a freestanding structure 170 away from the walls 160. The primary hollow member 95 angles or curves from the ceiling to the floor such that the primary hollow member 95 itself intercepts all of the light coming down, thereby illuminating the room 171. The aperture at the ceiling can be that of the entire primary hollow member 95; or in a similarly curved hollow member there can be a slit opening along the vertical axis of primary hollow member 95, allowing most of the light to be redirected upwards white letting a portion of light down into the lobby or foyer; or an uncurved primary hollow member 95 can be made in part or in whole of translucent material. The portion of the interior of the primary hollow member 95 that opens up to the room will not be coated with a highly reflective material. Rather it will be coated with a very diffuse reflecting surface such as white paint.

ADDITIONAL EMBODIMENT

Decorative

The hollow members 95, 270 are made of various reflective and transmissive materials that have different textures and graphics integrated into them. Some change or are changeable with the seasons. Beams of light from the hollow members 95, 270 are directed to chandeliers with moving, reflecting facets. Somewhat collimated light from a pick-off mirror is sent through fiber optic bundles integrated artistically into a chandelier. The beam may be sent through a color wheel before it is sent to the chandelier.

ADDITIONAL EMBODIMENT

Canted Primary Hollow Member and Horizontal Secondary Hollow Members

Figure 12:
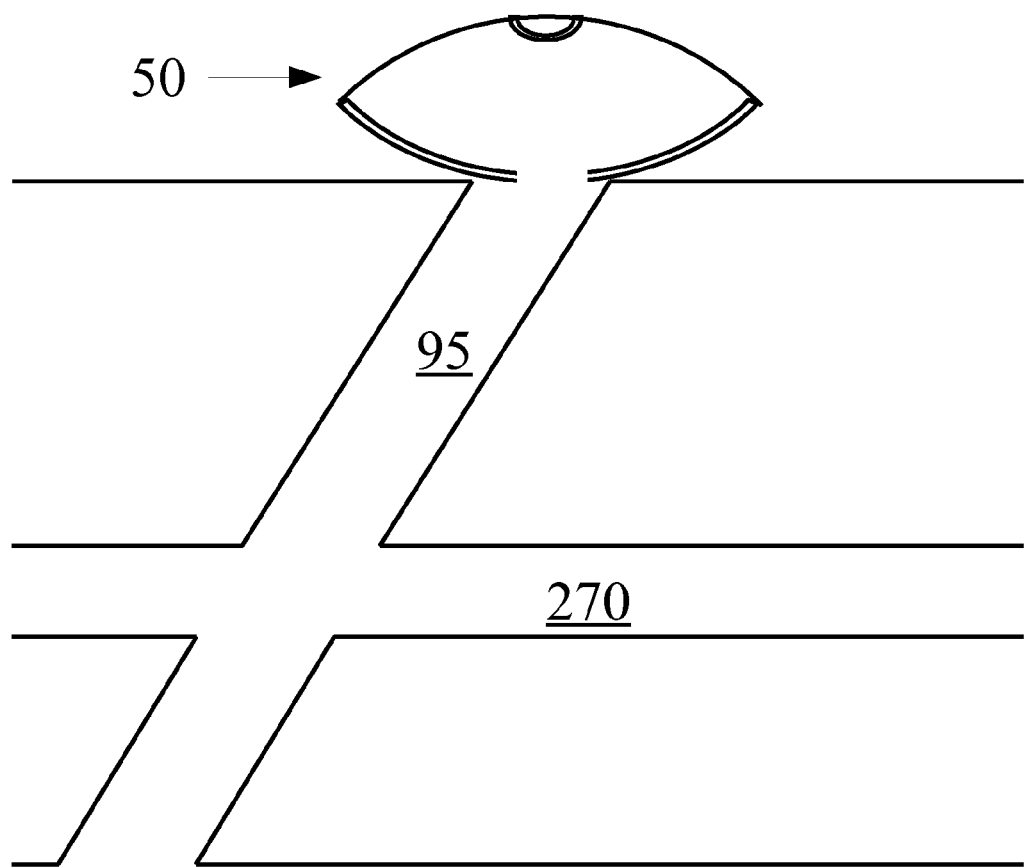
FIG. 12 shows a side view of an embodiment of the invention with a canted primary hollow member and horizontal secondary hollow members.

FIG. 12 shows an embodiment of the invention with a canted primary hollow member and horizontal secondary hollow members. The solar collector means 50 is disposed on top of the canted primary hollow member 95. Horizontal secondary hollow members 270 extend from the primary hollow member 95.

ADDITIONAL EMBODIMENT

Canted Primary and Secondary Hollow Members

Figure 13:
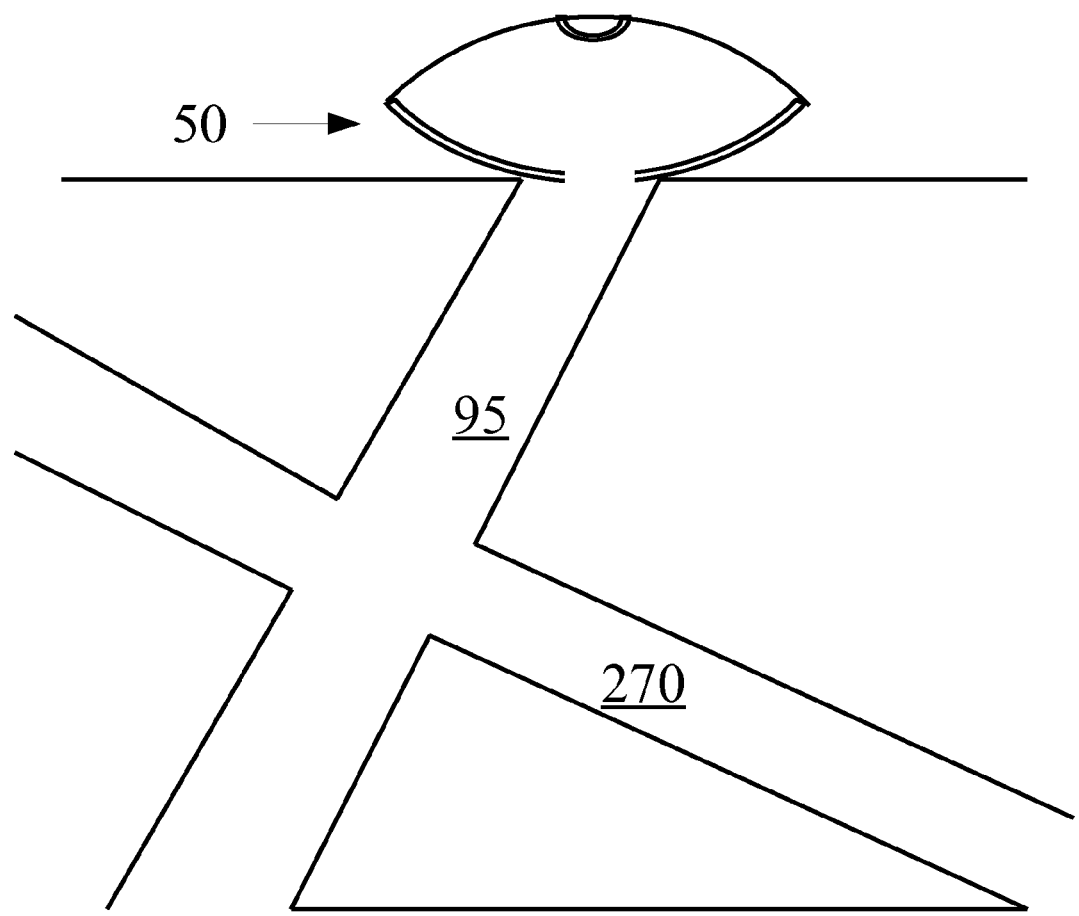
FIG. 13 shows a side view of an embodiment of the invention with canted primary and secondary hollow members.

FIG. 13 shows an embodiment of the invention with canted primary and secondary hollow members. The solar collector means 50 is disposed on top of the canted primary hollow member 95. Canted secondary hollow members 270 extend from the primary hollow member 95.

The Method

Figure 14:
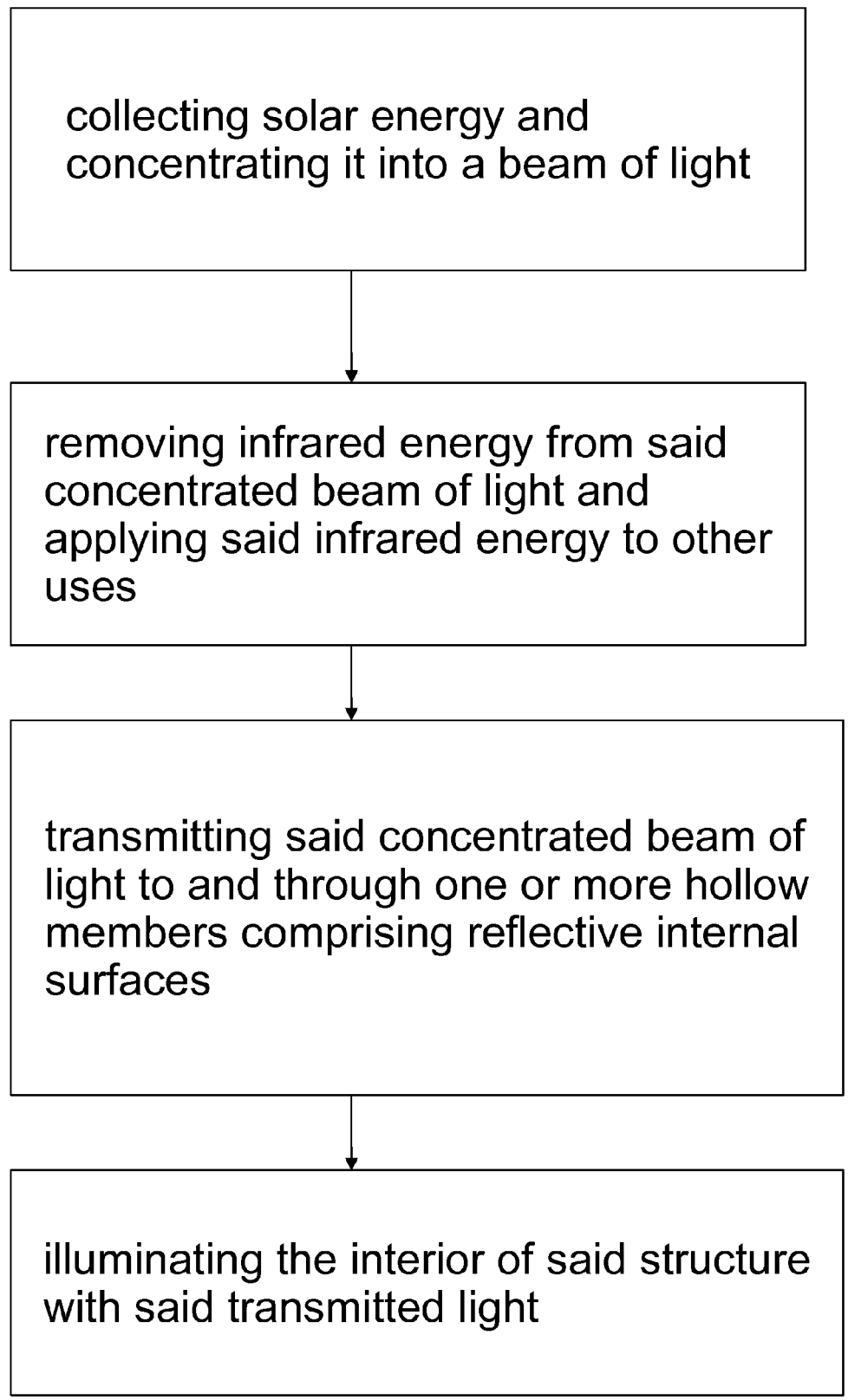
FIG. 14 shows a flowchart of the method

FIG. 14 shows a flowchart of the method. The method utilizes natural daylight to illuminate the interior of a structure and to utilize the heat of said daylight for the uses to which it is suited. It comprises:

A. collecting solar energy and concentrating it into a beam of light;

B. removing infrared energy from said concentrated beam of light and applying said infrared energy to other uses;

C. transmitting said concentrated beam of light to and through one or more hollow members comprising reflective internal surfaces; and D. illuminating the interior of said structure with said transmitted light.

Some advantages of the embodiments of the apparatus were previously enumerated in the Summary section. Every advantageous feature does not need to be incorporated into every embodiment of the apparatus and/or methods.

Although these versions of the invention have been described in considerable detail, other versions are possible. For example, the same structure could host multiple different embodiments or multiple copies of the same embodiment. Therefore, the spirit and scope of the appended claims should not be limited to the description of the versions contained therein.

What is claimed is:

1. A system for providing daylight illumination to the interior of a structure, said structure having a roof, ceiling and walls, said structure using solar energy as a source of light and heat, comprising:

A. a solar energy collector means, said collector means having a top side and a bottom side, said collector means utilizing a modified Cassegrainian optical system, said collector means producing a concentrated beam of sunlight, said collector means having a slot in said bottom side, said collector means directing said concentrated beam perpendicular to said bottom side through said slot, said collector means disposed on top of said roof of said structure;

B. a means of moving said collector means to an attitude tracking the sun's path in the sky during daylight hours;

C. a heat separation means for removing infrared energy from said concentrated beam of sunlight and for applying said infrared energy to other uses;

D. one or more vertical primary hollow members, each vertical primary hollow member having a first end and a second end, said first end comprising the upper end of said vertical hollow member, said second end comprising the lower end of said vertical hollow member, said vertical primary hollow member having an outside surface and an inside surface, said vertical primary hollow member comprising a reflective internal surface, said reflective internal surface being optically available to said concentrated beam of light transmitted through said vertical primary hollow member whereby at least a portion of said concentrated beam is reflected through said vertical primary hollow member by said reflective surface, said vertical primary hollow member having an end reflector inside of said vertical primary hollow member at said second end, said end reflector pointing back towards said first end, said vertical primary hollow member situated within and creating a space within said structure, said first end of said vertical primary hollow member in communication with and opening up to said roof of said structure, said solar energy collector means disposed on top of said first end of said vertical primary hollow member;

E. said vertical primary hollow member containing redirectional mirrors within its interior, said redirectional mirrors driven by a motor and controllable electronically, said primary hollow member situated in and creating a space within said structure; and F. two highly reflective first-surface specular tertiary mirrors attached to said solar energy collector at said slot along the longitudinal axis, said tertiary mirrors approximately rectangular in shape, the extent of each tertiary mirror along its longitudinal axis being slightly longer than the extent of the slot along its longitudinal axis, the extent of a tertiary mirror transverse to its longitudinal axis being approximately five times the extent of the slot transverse to its longitudinal axis, each tertiary mirror mounted on a hinge at the edge of the approximately rectangular slot in the parabolic trough, the plane of the tertiary mirrors parallel to the length of the parabolic trough, the tertiary mirrors having their reflective surfaces facing towards the interior space of the vertical primary hollow member and towards each other.

2. The system of claim 1, wherein one or more movable translucent panels cover said opening in said interior wall or ceiling of said building, said translucent panel or panels covered with a movable shutter or shutters, said movable shutter or shutters each having a surface fabricated from or covered with reflective material, said reflective material facing said hollow member, said movable shutter or shutters are driven by a motor and controllable electronically.

3. The system of claim 1, wherein said solar energy collector is a parabolic trough, said parabolic trough having a top side and a bottom side and two ends, said parabolic trough disposed on top of said roof, said parabolic trough having a longitudinal axis, said longitudinal axis oriented approximately on a North-South axis, said top side comprising a reflective surface.

4. The system of claim 3, wherein said parabolic trough is tilted at an angle with respect to the surface of the earth, said angle approximately equal to the latitude of the system's installation.

5. The system of claim 3, wherein a means of moving said parabolic trough is attached to said parabolic trough, said means of moving causing said parabolic trough to track the sun's position in the sky during daylight hours and thereby locating and keeping the sun in line of focus of said parabolic trough.

6. The system of claim 1, wherein connected to and in communication with said vertical primary hollow member are one or more secondary hollow members, said secondary hollow members each having two ends and an inside and an outside, said secondary hollow members each comprising a reflective internal surface, at least one of said secondary members opening up to and in communication with an opening in an interior wall or ceiling of said structure, said reflective internal surfaces of said vertical primary hollow member and said secondary hollow members being optically available to said concentrated beam of light transmitted through said vertical primary hollow member and said secondary hollow members whereby at least a portion of said concentrated beam is reflected through said vertical primary hollow member and said secondary hollow members by said reflective surfaces, said secondary hollow members disposed at an angle between zero and ninety degrees inclusive as measured from said vertical primary hollow member.

7. The system of claim 1, wherein said heat separation means comprises a glass sheet having a solar heat gain coefficient sufficient to remove most of the heat, a visual transmittance sufficient to transmit most of the visible light, an infrared reflectance sufficient to remove most of the infrared radiation, and a visual transmittance sufficient to transmit most of the visible light.

8. The system of claim 1, wherein said hollow members are selected from the group consisting of rectilinear boxes and tubes.

9. The system of claim 1, wherein said solar energy collector is a parabolic dish.

10. A system for providing daylight illumination to the interior of a structure, said structure having a roof, ceiling and walls, said structure using solar energy as a source of light and heat, comprising:

A. a solar energy collector means, said collector means having a top side and a bottom side, said collector means utilizing a modified Cassegrainian optical system, said collector means producing a concentrated beam of sunlight, said collector means having a slot in said bottom side, said collector means directing said concentrated beam perpendicular to said bottom side through said slot through said slot;

B. a means of moving said collector means to an attitude tracking the sun's path in the sky during daylight hours;

C. a heat separation means for removing heat from said concentrated beam of sunlight and for applying said heat to other uses;

D. one or more primary hollow members, each said primary hollow member having a first end and a second end, said primary hollow member having an outside and an inside surface, said primary hollow member comprising a reflective internal surface, said reflective internal surface being optically available to said concentrated beam of light transmitted through said primary hollow member whereby at least a portion of said concentrated beam is reflected through said primary hollow member by said reflective surface, said primary hollow member having an end reflector inside of said primary hollow member at said second end, said end reflector pointing back towards said first end;

E. said primary hollow member containing redirectional mirrors within its interior, said redirectional mirrors driven by a motor and controllable electronically, said primary hollow member situated in and creating a space within said structure; and F. a means for transmitting said concentrated beam of light from said solar energy collector to said primary hollow member.

11. The system of claim 10, wherein one or more translucent panels cover said opening in said interior wall or ceiling of said building, said translucent panel or panels covered with a movable shutter or shutters, said movable shutter or shutters each having a surface fabricated from or covered with reflective material, said reflective material facing said hollow member, said movable shutter or shutters are driven by a motor and controllable electronically.

12. The system of claim 10, wherein said means for transmitting said concentrated beam of light from said solar energy collector to said primary hollow member is selected from the group consisting of light pipes and fiber optics.

13. The system of claim 10, wherein said solar energy collector is a parabolic trough, said parabolic trough having a top side and a bottom side, said parabolic trough having two ends with respect to its longitudinal axis, said longitudinal axis oriented approximately on a North-South axis, said top side comprising a reflective surface.

14. The system of claim 13, wherein said parabolic trough is tilted at an angle with respect to the earth, said angle approximately equal to the latitude of the system's installation.

15. The system of claim 13, wherein a means of moving said parabolic trough to track the sun's position in the sky, maintaining the sun in the line of focus of the parabolic trough, during daylight hours is attached to said parabolic trough.

16. The system of claim 10, wherein connected to and in communication with said primary hollow member or members are one or more secondary hollow members, said secondary hollow members each having two ends and an inside and an outside, said secondary hollow members each comprising a reflective internal surface, at least one of said secondary members opening up to and in communication with an opening in an interior wall or ceiling of said structure, said reflective internal surfaces of said primary hollow member and said secondary hollow members being optically available to said concentrated beam of light transmitted through said primary hollow member and said secondary hollow members whereby at least a portion of said concentrated beam is reflected through said primary hollow member and said secondary hollow members by said reflective surfaces, said secondary hollow member canted at an angle between zero degrees and ninety degrees, inclusive, with respect to a tangent to the surface of the earth.

17. The system of claim 10, wherein said heat separation means comprises a glass sheet having a solar heat gain coefficient sufficient to remove most of the infrared energy, a visual transmittance sufficient to transmit most of the visible light, an infrared reflectance sufficient to remove most of the infrared energy, and a visual transmittance sufficient to transmit most of the visible light.

18. The system of claim 10, wherein said hollow members are selected from the group consisting of rectilinear boxes and tubes.

19. The system of claim 10, where said primary hollow member is canted at an angle between zero degrees and ninety degrees, inclusive, with respect to a tangent to the surface of the earth.

* * * * *